(12) United States Patent
Nishimura

(10) Patent No.: US 11,108,297 B2
(45) Date of Patent: Aug. 31, 2021

(54) MOTOR AND ROBOT

(71) Applicant: Seiko Epson Corporation, Tokyo (JP)

(72) Inventor: Yoshiteru Nishimura, Shiojiri (JP)

(73) Assignee: Seiko Epson Corporation

( * ) Notice: Subject to any disclaimer, the term of this patent is extended or adjusted under 35 U.S.C. 154(b) by 470 days.

(21) Appl. No.: 16/190,327

(22) Filed: Nov. 14, 2018

(65) Prior Publication Data

US 2019/0149011 A1 May 16, 2019

(30) Foreign Application Priority Data

Nov. 15, 2017 (JP) .............................. JP2017-219721

(51) Int. Cl.
| | |
|---|---|
| *H02K 5/173* | (2006.01) |
| *B25J 9/00* | (2006.01) |
| *H02K 11/22* | (2016.01) |
| *H02K 7/08* | (2006.01) |
| *H02K 7/00* | (2006.01) |
| *B25J 19/00* | (2006.01) |
| *B25J 9/12* | (2006.01) |

(52) U.S. Cl.
CPC .......... *H02K 5/1732* (2013.01); *B25J 9/0009* (2013.01); *B25J 9/126* (2013.01); *B25J 19/0075* (2013.01); *H02K 7/003* (2013.01); *H02K 7/083* (2013.01); *H02K 11/22* (2016.01); *H02K 2201/18* (2013.01)

(58) Field of Classification Search
CPC .. H02K 5/16; H02K 5/17; H02K 7/08; H02K 7/081
USPC .......................................... 310/90, 401, 425
See application file for complete search history.

(56) References Cited

U.S. PATENT DOCUMENTS

| | | | |
|---|---|---|---|
| 2018/0076684 A1* | 3/2018 | Hwang | ................. A47L 9/0081 |
| 2018/0252266 A1* | 9/2018 | Oketani | ............... H02K 5/1732 |

FOREIGN PATENT DOCUMENTS

| | | |
|---|---|---|
| JP | 2005-269785 A | 9/2005 |
| JP | 4706922 B2 * | 6/2011 |

OTHER PUBLICATIONS

Machine translation of JP-4706922-B2, retrieved from ESPACENET.*
Machine Translation of JP-4706922-B2, Year: 2011, retrieved from ESPACENET.*

* cited by examiner

*Primary Examiner* — Quyen P Leung
*Assistant Examiner* — Minki Chang
(74) *Attorney, Agent, or Firm* — Harness, Dickey & Pierce, P.L.C.

(57) ABSTRACT

An aspect of a motor according to the invention includes a stator, a rotor, a detector configured to detect a rotating position of the rotor, a holder disposed between the stator and the detector in the predetermined direction, and a bearing held by the holder and configured to rotatably support the shaft. A recess opened toward the stator and housing the bearing and an injection hole including a first opening opened toward the detector, the injection hole communicating with the recess, are provided in the holder. A groove into which an adhesive is injected is provided on the inner surface of the recess. The outer circumferential surface of the bearing is fixed to the inner surface via the adhesive. The injection hole includes a second opening opened in the inner circumferential surface of the recess and connected to the groove. The injection hole is closed by a screw.

7 Claims, 5 Drawing Sheets

MOTOR AND ROBOT

BACKGROUND

1. Technical Field

The present invention relates to a motor and a robot.

2. Related Art

There is known a motor in which a bearing that supports a shaft is fixed by an adhesive to a bracket that holds the bearing (see, for example, JP-A-2005-269785 (Patent Literature 1)). In the motor disclosed in Patent Literature 1, a hole for adhesive injection for injecting the adhesive between the bearing and the bracket is provided in the bracket.

However, in the motor explained above, for example, when a part of the adhesive injected from the hole for adhesive injection (an injection hole section) does not harden, a part of the adhesive is likely to leak to the outside of the bracket (a holding section) from the hole for adhesive injection.

SUMMARY

An advantage of some aspects of the invention is to provide a motor that can prevent an adhesive from leaking to the outside of a holding section that holds a bearing and a robot including such a motor.

An aspect of a motor according to the invention includes: a rotor including a shaft extending in a predetermined direction; a stator disposed to be opposed to the rotor in a radial direction of the shaft; a holding section disposed in one direction of the predetermined direction of the stator; a bearing held by the holding section and configured to rotatably support the shaft; and a detecting device disposed in the one direction of the holding section and configured to detect a rotating position of the rotor. A recessed section opened in another direction of the predetermined direction and housing the bearing and an injection hole section including a first opening section opened in the one direction in the holding section are provided in the holding section. An inner surface of the recessed section includes an inner circumferential surface to which an outer circumferential surface of the bearing is fixed via an adhesive. The injection hole section includes a second opening section opened in the inner circumferential surface of the recessed section. A female screw section is provided on an inner circumferential of the injection hole section. At least a part between the first opening section and the second opening section in the injection hole section is closed by a screw member screwed in the female screw section.

In the aspect of the motor according to invention, at least a part between the first opening section and the second opening section in the injection hole section is closed by the screw member. Therefore, for example, even if a part of the adhesive injected between the inner circumferential surface of the recessed section and the outer circumferential surface of the bearing does not harden, the unhardened adhesive is dammed by the screw member and prevented from leaking in the one direction of the holding section from the first opening section. Therefore, according to the aspect of the invention, it is possible to obtain the motor that can prevent the adhesive from leaking to the outside of the holding section that holds the bearing. As a result, for example, the adhesive can be prevented from adhering to the detecting device. Consequently, a deficiency such as a failure of the detecting device or deterioration in detection accuracy of the detecting device can be prevented from occurring.

The screw member may close the first opening section.

With this configuration, it is unnecessary to screw the screw member into the depth of the injection hole section. The screw member is easily attached to the injection hole section. Therefore, work for closing the injection hole section with the screw member can be facilitated. Assemblability of the motor can be improved.

An end portion in the one direction of the screw member may be disposed in a same position as a circumferential edge portion of the first opening section in the predetermined direction or further in the other direction than the circumferential edge portion of the first opening section.

With this configuration, the screw member does not project further in the one direction of the predetermined direction than the holding section. The detecting device is easily disposed closer to the holding section. Consequently, the motor is easily reduced in size in the predetermined direction.

The detecting device may include: a section to be detected fixed to the shaft; and a sensor section capable of detecting a rotating position of the section to be detected. The section to be detected may cover the one direction of the first opening section.

In such a configuration, when the adhesive leaks from the first opening section, the adhesive easily adheres to the section to be detected. Therefore, when the adhesive leaks, a deficiency easily occurs, in particular, in the detecting device. Therefore, the effect of preventing the adhesive from adhering to the detecting device can be particularly usefully obtained in the configuration in which the one direction of the first opening section is covered by the section to be detected.

The detecting device may be an optical detecting device.

In such a configuration, when the adhesive adheres to the detecting device, a deficiency easily occurs, in particular, in the detecting device. Therefore, the effect of preventing the adhesive from adhering to the detecting device can be particularly usefully obtained when the detecting device is the optical detecting device.

The adhesive may be an anaerobic adhesive.

For example, a part of the adhesive for fixing the outer circumferential surface of the bearing and the inner circumferential surface of the recessed section comes into contact with the atmosphere in the injection hole section. Therefore, when the adhesive is anaerobic, a part of the adhesive is considered to not harden. Accordingly, when the adhesive is the anaerobic adhesive, in particular, a part of the adhesive does not harden and easily leaks to the outside of the injection hole section. Therefore, the effect of preventing the adhesive from leaking from the injection hole section can be particularly usefully obtained when the adhesive is the anaerobic adhesive.

For example, when the unhardened adhesive reaches the screw member via the injection hole section, the unhardened adhesive sometimes intrudes between a male screw section of the screw member and the female screw section of the injection hole section. In this case, the adhesive intruding between the male screw section of the screw member and the female screw section of the injection hole section is blocked from the air. Therefore, with this configuration, the unhardened adhesive hardens and is further prevented from leaking to the outside of the injection hole section. Further, the screw member is fixed to the injection hole section by the adhesive.

The screw member can be prevented from loosening with respect to the injection hole section.

Another aspect of a robot according to the invention includes the motor described above.

According to the aspect of the robot according to the invention, the robot includes the motor. Therefore, the robot excellent in reliability can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
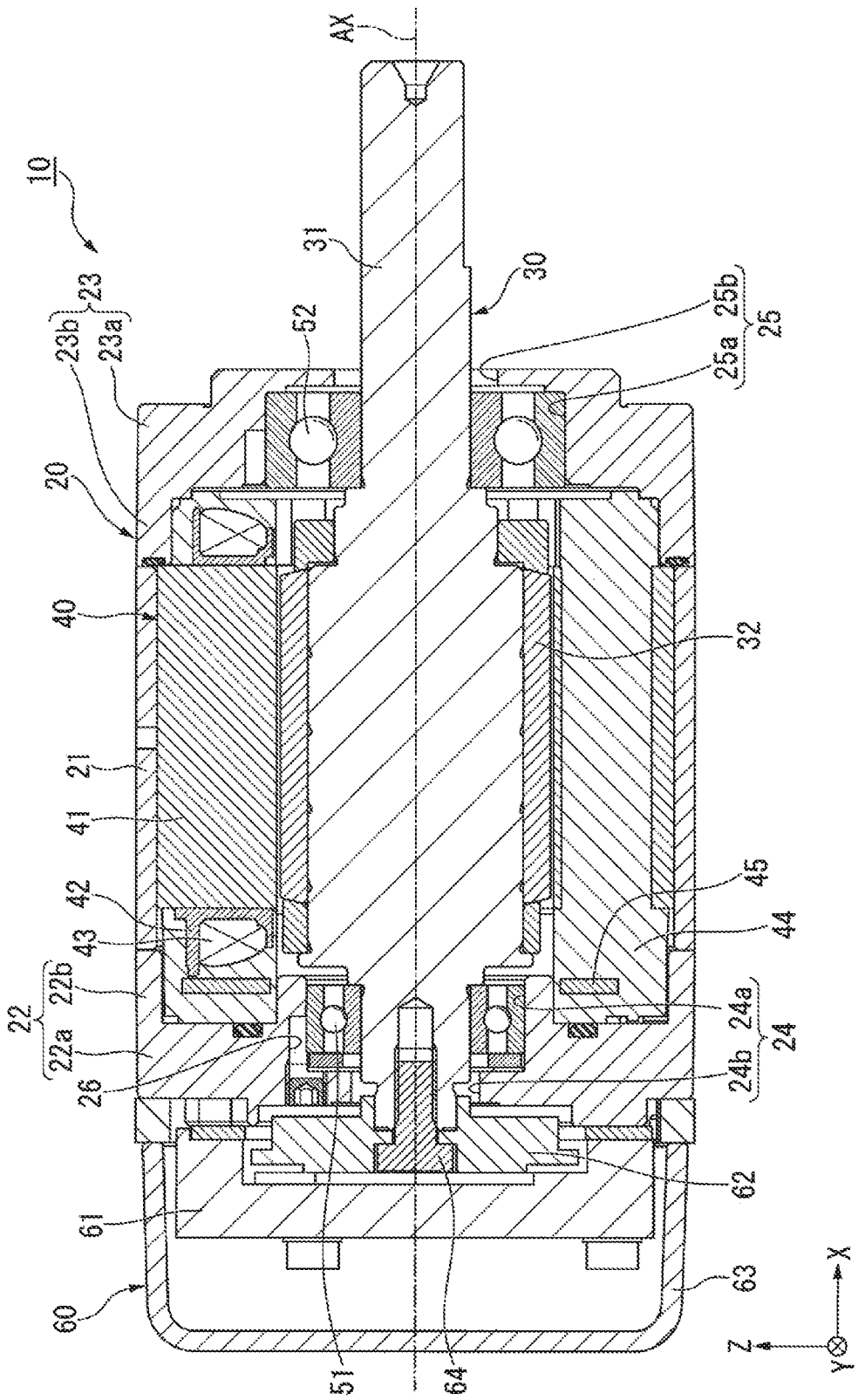
FIG. 1 is a diagram showing a motor in an embodiment and is a I-I sectional view in FIG. 2.

A motor and a robot according to an embodiment of the invention is explained below with reference to the drawings. Note that the scope of the invention is not limited to the embodiment explained below and can be optionally changed within the scope of the technical idea of the invention. In the drawings referred to below, scales, numbers, and the like in structures are sometimes differentiated from those in actual structures to clearly show components.

In an XYZ orthogonal coordinate system shown in the figures, a direction parallel to a Z-axis direction is referred to as "up-down direction", a direction parallel to a Y-axis direction is referred to as "left-right direction", and a direction parallel to an X-axis direction is referred to as "front-rear direction (predetermined direction)". A positive direction in the X-axis direction (a rightward direction in FIG. 1) is referred to as "forward (the other direction of the predetermined direction)" and a negative direction in the X-axis direction (a leftward direction in FIG. 1) is referred to as "rearward (one direction of the predetermined direction)". In the figures, a center axis AX, which is an imaginary axis extending in the front-rear direction, is shown as appropriate. Unless particularly noted otherwise, a radial direction centering on the center axis AX is simply referred to as "radial direction" and a circumferential direction centering on the center axis AX is simply referred to as "circumferential direction".

Note that the up-down direction, the left-right direction, the front-rear direction, the forward, and the rearward are only names for explaining relative positional relations among sections. Actual relative positional relations and postures of the sections may be relative positional relations and postures other than the relative positional relations and the postures indicated by these names.

Motor in the Embodiment

Figure 2:
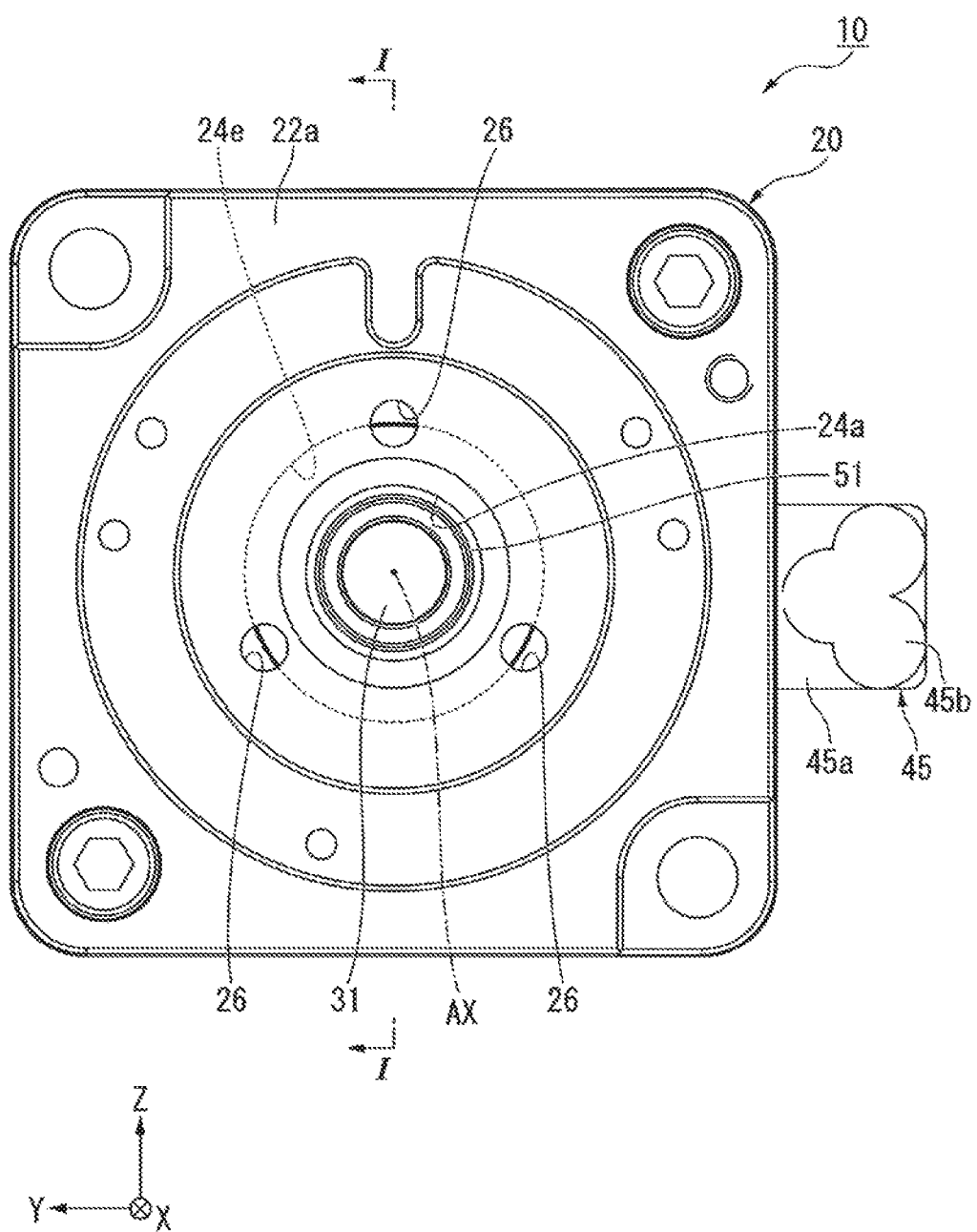
FIG. 2 is a rear view of the motor in the embodiment.
Figure 3:
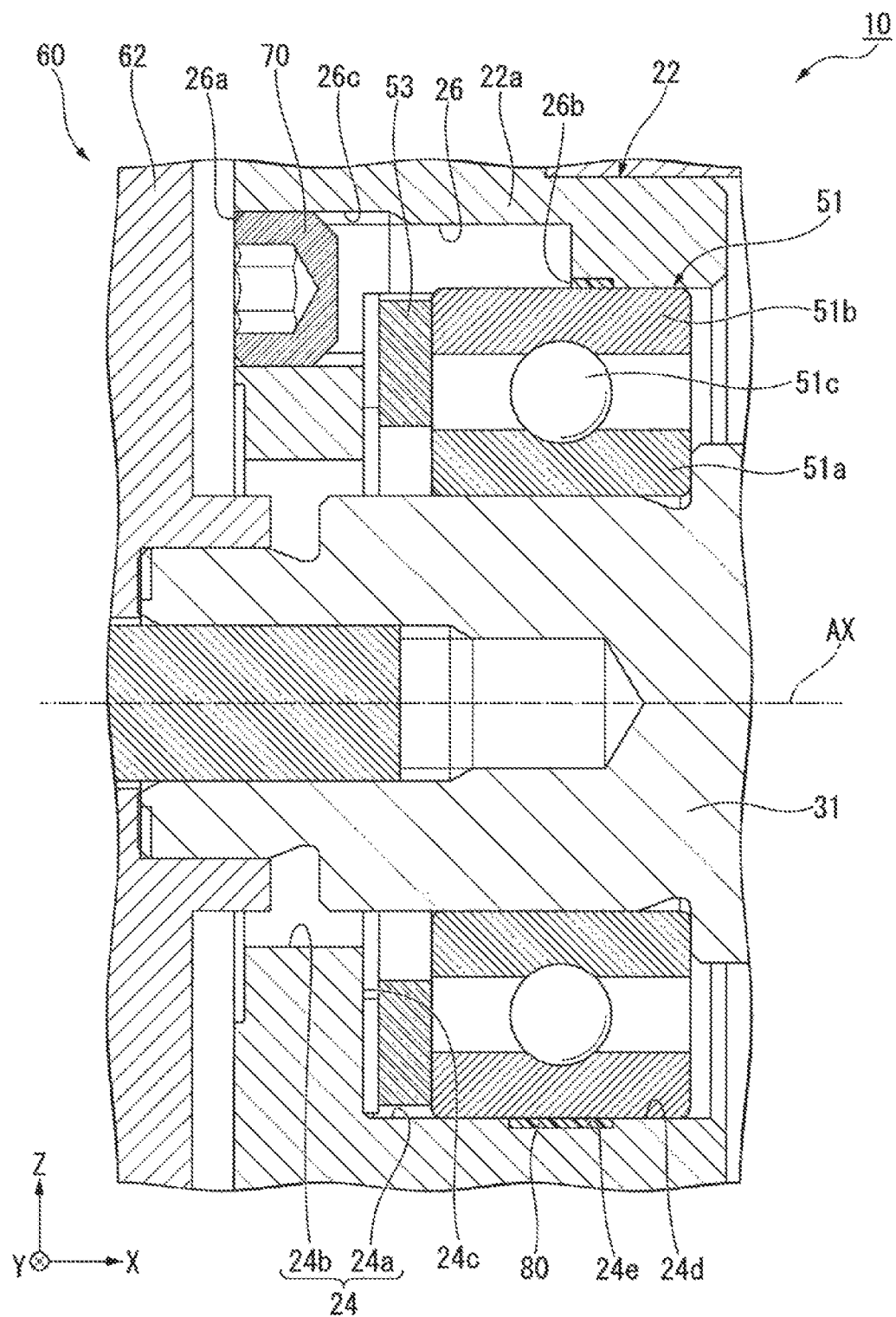
FIG. 3 is a sectional view of a part of the motor in the embodiment and is a partially enlarged view in FIG. 1.
Figure 4:
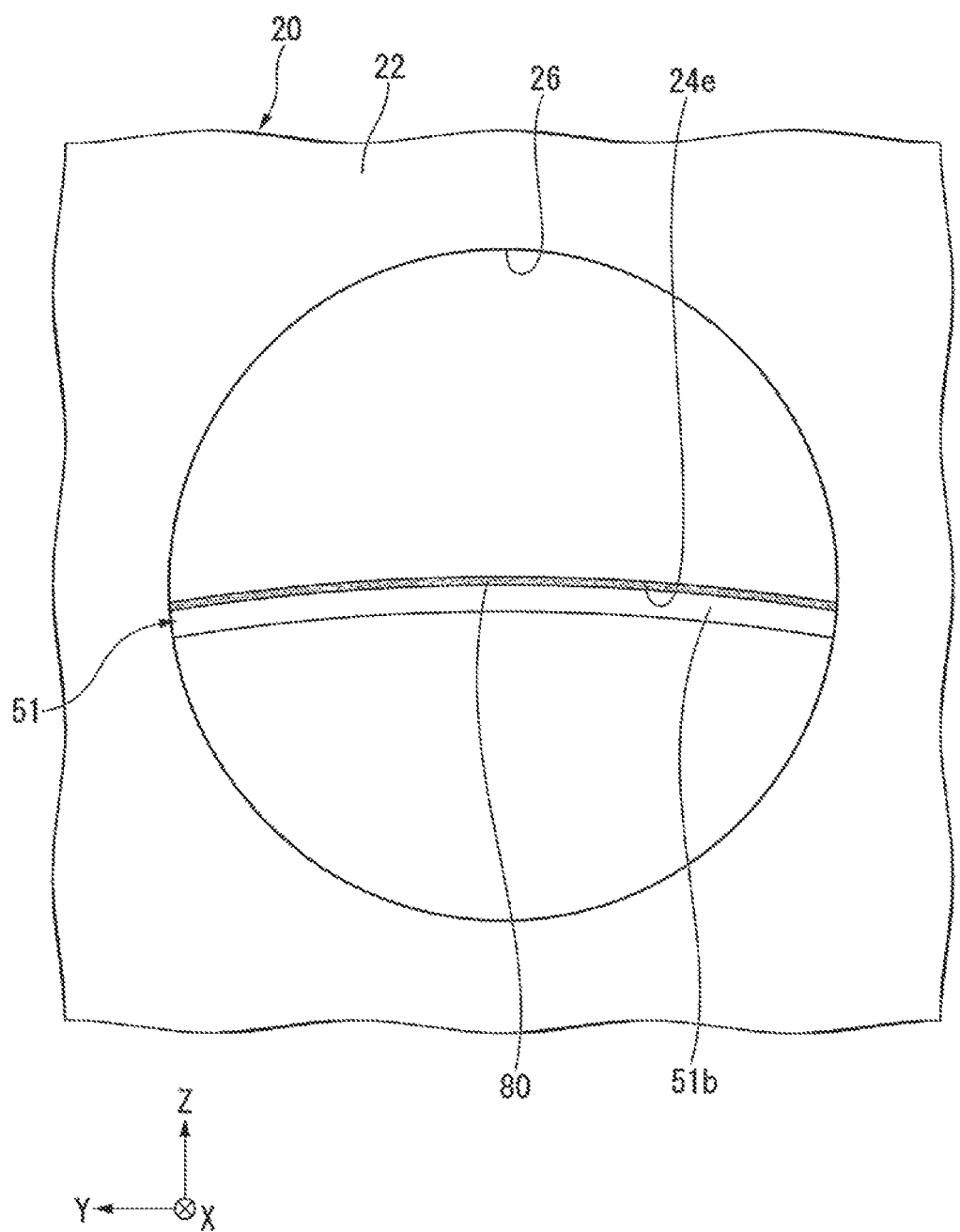
FIG. 4 is a rear view of a part of the motor in the embodiment and is a partially enlarged view in FIG. 2.

FIG. 1 is a sectional view showing a motor 10 in the embodiment. FIG. 2 is a rear view of the motor 10 in the embodiment. FIG. 3 is a sectional view of a part of the motor 10 in the embodiment. FIG. 4 is a rear view of a part of the motor 10 in the embodiment. FIG. 1 is a I-I sectional view in FIG. 2. FIG. 3 is a partially enlarged view in FIG. 1. In FIGS. 2 and 4, illustration of a detecting device (a detector) 60 and a screw member 70 explained below is omitted.

The motor 10 includes, as shown in FIGS. 1 and 2, a housing 20, a rotor 30 including a shaft 31 extending in the front-rear direction, a stator 40, a mold section 44, a circuit board 45, bearings 51 and 52, and a detecting device 60.

The housing 20 has a square cylindrical shape extending in the front-rear direction centering on the center axis AX. The outward surface of the housing 20 includes a pair of side surfaces parallel to the up-down direction and extending in the front-rear direction and a pair of side surfaces parallel to the left-right direction and extending in the front-rear direction. The housing 20 houses, as shown in FIG. 1, the rotor 30, the bearings 51 and 52, and the stator 40 on the inside. In this embodiment, the housing 20 includes a first housing 21, a second housing (a holder) 22, and a third housing 23. The first housing 21, the second housing 22, and the third housing 23 are members separate from one another.

The first housing 21 has a square cylindrical shape opened in both directions of the front-rear direction. The inner circumferential surface of the first housing 21 has a cylindrical shape centering on the center axis AX.

The second housing 22 is fixed to the rear of the first housing 21. The second housing 22 is disposed behind the stator 40. The second housing 22 includes a rear lid section (a rear lid) 22a and a rear cylinder section 22b. The rear lid section 22a covers the rear of the stator 40. The external shape of the rear lid section 22a is, as shown in FIG. 2, a rounded square shape when viewed along the front-rear direction.

In the rear lid section 22a, as shown in FIG. 1, a rear through-hole 24 piercing through the rear lid section 22a in the front-rear direction is formed. The rear end portion of the shaft 31 is inserted through the rear through-hole 24. The rear through-hole 24 is formed by connecting a rear housing recessed section (a recess) 24a and a rear insert-through hole section (a rear insert-through hole) 24b in the front-rear direction. The rear housing recessed section 24a is a recessed section recessed rearward from the front surface of the rear lid section 22a. The rear housing recessed section 24a is opened forward and houses the bearing 51. The inner surface of the rear housing recessed section 24a includes, as shown in FIG. 3, a bottom surface 24c and an inner circumferential surface 24d. Note that the rear housing recessed section 24a may not be opened forward and only has to be recessed to be capable of housing the bearing 51.

The bottom surface 24c is a surface orthogonal to the front-rear direction and facing forward. The bottom surface 24c has an annular shape centering on the center axis AX. The bottom surface 24c supports the bearing 51 from the rear via a web washer 53 explained below. The inner circumferential surface 24d extends forward from the outer circumferential edge portion of the bottom surface 24c. The inner circumferential surface 24d is a cylindrical surface orthogonal to the radial direction. A groove 24e is formed on the inner circumferential surface 24d. As shown in FIG. 2, the groove 24e has an annular shape centering on the center axis AX. As shown in FIG. 3, the groove 24e is formed in a position opposed to the bearing 51 in the radial direction.

The rear insert-through hole section 24b pierces through the bottom surface 24c to the rear surface of the rear lid section 22a. The rear insert-through hole section 24b centers on the center axis AX. The inner diameter of the rear insert-through hole section 24b is smaller than the inner diameter of the rear housing recessed section 24a.

In the rear lid section 22a, an injection hole section (an injection hole) 26 recessed forward from the rear surface of the rear lid section 22a is formed. The injection hole section 26 is disposed in the radially outward direction of the rear insert-through hole section 24b. The injection hole section 26 includes a first opening section (a first opening) 26a and a second opening section (a second opening) 26b. The first opening section 26a is opened in the rear of the rear lid section 22a. That is, in this embodiment, the first opening section 26a is opened in the rear surface of the rear lid section 22a (the rear surface of the second housing 22). Consequently, the first opening section 26a is opened to the outside of the housing 20.

The second opening section 26b is opened in the inner circumferential surface 24d of the rear housing recessed section 24a. Consequently, the second opening section 26b is opened to the inside of the rear housing recessed section 24a. In this embodiment, the second opening section 26b is provided across the bottom surface 24c and the inner circumferential surface 24d. That is, in this embodiment, the second opening section 26b is opened in the bottom surface 24c as well. The second opening section 26b is connected to the groove 24e. In a state in which a screw member 70 explained below is not attached, the injection hole section 26 causes the inside of the rear housing recessed section 24a and the outside of the housing 20 to communicate.

A female screw section 26c is formed in at least a part of the inner circumferential surface of the injection hole section 26. In this embodiment, the female screw section 26c is formed in a rear portion in the inner circumferential surface of the injection hole section 26. As shown in FIG. 4, a portion in the radially inward direction in the injection hole section 26 overlaps the groove 24e and an outer ring 51b explained below in the bearing 51 when viewed from the rear. The injection hole section 26 is a circular hole. As shown in FIG. 2, in this embodiment, a plurality of injection hole sections 26 are formed at equal intervals over the entire circumference along the circumferential direction. The number of the injection hole sections 26 is, for example, three. The size of the injection hole section 26 is a size enough for inserting a dispenser for injecting an unhardened adhesive 80 explained below into the groove 24e.

As shown in FIG. 3, a screw member 70 is screwed in the female screw section 26c of the injection hole section 26. Consequently, at least a part of the first opening section 26a to the second opening section 26b in the injection hole section 26 is closed by the screw member 70. In this embodiment, the screw member 70 closes the first opening section 26a. The screw member 70 is, for example, a slotted set screw. The rear end portion of the screw member 70 is disposed in the same position as the circumferential edge portion of the first opening section 26a in the front-rear direction. In this embodiment, the circumferential edge portion of the first opening section 26a is a part of the rear surface of the rear lid section 22a. The front end portion of the screw member 70 is located behind the bottom surface 24c of the rear housing recessed section 24a.

As shown in FIG. 1, the rear cylinder section 22b projects forward from the outer circumferential edge portion of the rear lid section 22a. The front end portion of the rear cylinder section 22b is in contact with the rear end portion of the first housing 21.

The third housing 23 is fixed to the front of the first housing 21. The third housing 23 is disposed in the front of the stator 40. The third housing 23 includes a front lid section (a front lid) 23a and a front cylinder section 23b. The front lid section 23a covers the front of the stator 40. The external shape of the front lid section 23a is a rounded square shape like the rear lid section 22a when viewed along the front-rear direction.

In the front lid section 23a, a front through-hole 25 piercing through the front lid section 23a in the front-rear direction is formed. The front end portion of the shaft 31 is inserted through the front through-hole 25. The front through-hole 25 is formed by connecting a front housing recessed section (a front housing recess) 25a and a front insert-through hole section 25b in the front-rear direction. The front housing recessed section 25a is a recessed section recessed forward from the rear surface of the front lid section 23a. The front housing recessed section 25a is opened rearward and houses the bearing 52. The front insert-through hole section 25b pierces through the bottom surface of the front housing recessed section 25a to the front surface of the front lid section 23a. The front insert-through hole section 25b centers on the center axis AX. The inner diameter of the front insert-through hole section 25b is smaller than the inner diameter of the front housing recessed section 25a. Note that the front housing recessed section 25a may not be opened rearward and only has to be recessed to be capable of housing the bearing 52.

The front cylinder section 23b projects rearward from the outer circumferential edge portion of the front lid section 23a. The rear end portion of the front cylinder section 23b is in contact with the front end portion of the first housing 21. An 0 ring is disposed between the rear end portion of the front cylinder section 23b and the front end portion of the first housing 21.

The rotor 30 includes the shaft 31 and a magnet 32. The shaft 31 has a columnar shape centering on the center axis AX. The rear end portion of the shaft 31 projects to the outside of the housing 20 via the rear through-hole 24. The front end portion of the shaft 31 projects to the outside of the housing 20 via the front through-hole 25. The front end portion of the shaft 31 is an output section to which a driven section driven by the motor 10 is attached. The magnet 32 has a cylindrical shape extending in the front-rear direction. The magnet 32 is fixed to the outer circumferential surface of the shaft 31.

The stator 40 is disposed to be opposed to the rotor 30 via a gap in the radial direction of the shaft 31. The stator 40 surrounds the radially outward direction of the magnet 32. The stator 40 includes a stator core 41, an insulator 42, and a plurality of coils 43.

The stator core 41 is an annular member surrounding the radially outward direction of the magnet 32. The outer circumferential surface of the stator core 41 is fixed to the inner circumferential surface of the first housing 21. The insulator 42 is an insulative member mounted on the stator core 41. The plurality of coils 43 are mounted on the stator core 41 via the insulator 42. The plurality of coils 43 are disposed at equal intervals over the entire circumference along the circumferential direction.

The mold section 44 is a resin portion that covers the periphery of the stator 40 excluding both end portions in the radial direction in the stator core 41. The stator 40 is embedded in the mold section 44. The mold section 44 has a substantially cylindrical shape extending in the front-rear direction. The rear end portion of the mold section 44 is in contact with the front surface of the rear lid section 22a. An 0 ring is disposed between the rear end portion of the mold section 44 and the front surface of the rear lid section 22a.

The circuit board 45 is embedded in the mold section 44 behind the stator 40. The circuit board 45 has a plate shape, a plate surface of which is orthogonal to the front-rear direction. Although illustration is omitted, coil wires configuring the coils 43 are connected to the circuit board 45. As shown in FIG. 2, the circuit board 45 includes a projecting section 45a projecting to the outside of the housing 20. The projecting section 45a projects in one direction of the left-right direction from the rear cylinder section 22b of the second housing 22. A connection terminal section 45b is formed in the projecting section 45a. Electric power can be supplied to the coils 43 by connecting a power supply to the connection terminal section 45b.

In this embodiment, as shown in FIG. 1, the bearings 51 and 52 are ball bearings. The bearings 51 and 52 rotatably support the shaft 31. The bearing 51 is housed in the rear housing recessed section 24a and is held by the second housing 22. The bearing 51 includes, as shown in FIG. 3, an inner ring 51a, an outer ring 51b, and a plurality of balls 51c. The inner ring 51a has a cylindrical shape centering on the center axis AX. The inner ring 51a is fit in the shaft 31. For example, the inner ring 51a is pressed into the shaft 31 and fixed.

The outer ring 51b is disposed in the radially outward direction of the inner ring 51a. The outer ring 51b has a cylindrical shape centering on the center axis AX. The outer ring 51b is fit in the rear housing recessed section 24a. For example, the outer ring 51b is loose-fit in the rear housing recessed section 24a. The outer circumferential surface of the outer ring 51b (the outer circumferential surface of the bearing 51) is fixed to the inner circumferential surface 24d of the rear housing recessed section 24a via an adhesive 80 injected into the groove 24e. The adhesive 80 is, for example, an anaerobic adhesive.

The plurality of balls 51c are disposed between the inner ring 51a and the outer ring 51b in the radial direction and couple the inner ring 51a and the outer ring 51b. The plurality of balls 51c are disposed along the circumferential direction. A web washer 53 is disposed behind the bearing 51. The web washer 53 is in contact with the bottom surface 24c of the rear housing recessed section 24a and the rear end portion of the outer ring 51b. The web washer 53 applies a pre-load to the outer ring 51b forward.

As shown in FIG. 1, the bearing 52 is housed in the front housing recessed section 25a and held by the third housing 23. The structure of the bearing 52 is the same as the structure of the bearing 51. A method of fixing the bearing 52 is the same as the method of fixing the bearing 51.

The detecting device 60 is disposed behind the second housing 22. The detecting device 60 detects a rotating position of the rotor 30. In this embodiment, the detecting device 60 is an optical detecting device. The detecting device 60 includes a section to be detected 62, a sensor section 61, and a case 63.

The section to be detected 62 is a disk-shaped member expanding in the radial direction. The section to be detected 62 is fixed to the shaft 31. More specifically, the section to be detected 62 is fixed to the rear end portion of the shaft 31 by a screw 64. As shown in FIG. 3, the section to be detected 62 covers the rear of the first opening section 26a in the injection hole section 26. Although illustration is omitted, a reflecting section that reflects light and a non-reflecting section that does not reflect light are provided on the rear surface of the section to be detected 62. The non-reflecting section is, for example, a plurality of slits piercing through the section to be detected 62 in the front-rear direction.

As shown in FIG. 1, the sensor section 61 is disposed behind the section to be detected 62. The sensor section 61 is fixed to the rear surface of the second housing 22. Although illustration is omitted, the sensor section 61 includes a light source section configured to irradiate light on the section to be detected 62 and a light receiving section configured to detect the light reflected by the reflecting section in the section to be detected 62. A portion of the section to be detected 62 on which the light from the light source section is irradiated changes between the reflecting section and the non-reflecting section according to rotation of the section to be detected 62 that rotates together with the shaft 31. Consequently, the sensor section 61 is capable of detecting a rotating position of the section to be detected 62 by detecting the light with the light receiving section. Therefore, the detecting device 60 can detect a rotating position of the rotor 30 that rotates together with the section to be detected 62.

The case 63 is a square cylindrical member opened forward and including a bottom section rearward. The case 63 covers the rear and the radially outward direction of the sensor section 61. The front end portion of the case 63 is fixed to the rear lid section 22a in the second housing 22. The case 63 configures a part of the outer shell of the motor 10 in conjunction with the housing 20.

A method of fixing the bearing 51 is explained. When fixing the bearing 51, an operator inserts a dispenser into the injection hole section 26 from the first opening section 26a in a state in which the bearing 51 is fit in the rear housing recessed section 24a and injects the unhardened adhesive 80 into the groove 24e opened to the injection hole section 26. The unhardened adhesive 80 injected into the groove 24e is filled in the entire annular groove 24e by, for example, the capillary phenomenon. When the unhardened adhesive 80 hardens, the outer circumferential surface of the outer ring 51b in the bearing 51 is fixed to the inner circumferential surface of the rear housing recessed section 24a by the adhesive 80. Consequently, the operator can fix the bearing 51 to the second housing 22. Thereafter, the operator screws the screw member 70 in the female screw section 26c and closes the first opening section 26a.

According to this embodiment, at least a part of the first opening section 26a to the second opening section 26b in the injection hole section 26 is closed by the screw member 70. Therefore, for example, even if a part of the adhesive 80 injected between the inner circumferential surface of rear housing recessed section 24a and the outer circumferential surface of the bearing 51 does not harden, the unhardened adhesive 80 is dammed by the screw member 70. The unhardened adhesive 80 can be prevented from leaking from the first opening section 26a to the rear of the second housing 22. Therefore, according to this embodiment, it is possible to obtain the motor 10 that can prevent the adhesive 80 from leaking to the outside of the second housing 22 that holds the bearing 51. As a result, the adhesive 80 can be prevented from adhering to the detecting device 60. Consequently, a deficiency such as a failure of the detecting device 60 or deterioration in detection accuracy of the detecting device 60 can be prevented from occurring.

For example, a configuration is also conceivable in which a surface that closes the first opening section 26a from the rear is provided in the detecting device 60 and the adhesive 80 is prevented from leaking from the first opening section 26a by the detecting device 60 itself. However, in this case, if accuracy of the surface of the detecting device 60 that closes the first opening section 26a is low, the first opening section 26a is incompletely closed. The adhesive 80 is likely to leak. When such a surface is provided, complication and an increase in the size of the detecting device 60 are likely to be caused.

On the other hand, according to this embodiment, the member that closes the injection hole section 26 is the screw member 70. Therefore, the injection hole section 26 can be accurately closed by a simple configuration. It is unnecessary to provide a surface that closes the injection hole section 26 in the detecting device 60. Therefore, complication and an increase in the size of the detecting device 60 can be prevented.

According to this embodiment, the screw member 70 closes the first opening section 26a. Therefore, it is unnecessary to screw the screw member 70 into the depth of the injection hole section 26. The screw member 70 is easily attached to the injection hole section 26. Therefore, work for closing the injection hole section 26 with the screw member 70 can be facilitated. Assemblability of the motor 10 can be improved.

According to this embodiment, the rear end portion of the screw member 70 is disposed in the same position as the circumferential edge portion of the first opening section 26a in the front-rear direction. Therefore, the screw member 70 does not project further rearward than the second housing 22. The detecting device 60 is easily disposed closer to the second housing 22. Consequently, the motor 10 can be easily reduced in size in the front-rear direction. In particular, as in this embodiment, when the section to be detected 62 is disposed behind the first opening section 26a, the section to be detected 62 is easily disposed close to the second housing 22.

In the configuration in which the rear of the first opening section 26a is covered by the section to be detected 62 as in this embodiment, when the adhesive 80 leaks from the first opening section 26a, the adhesive 80 easily adheres to the section to be detected 62. Therefore, in such a configuration, when the adhesive 80 leaks, a deficiency easily occurs, in particular, in the detecting device 60. Therefore, the effect of preventing the adhesive from adhering to the detecting device 60 can be particularly usefully obtained in the configuration in which the rear of the first opening section 26a is covered by the section to be detected 62.

When the detecting device 60 is the optical detecting device as in this embodiment, light emitted from the detecting device 60 is sometimes made incident on the adhesive 80 adhering to the section to be detected 62. In this case, a deficiency such as a change in the direction of the light reflected by the reflecting section of the section to be detected 62 or reflection of the light traveling to the non-reflecting section of the section to be detected 62 is likely to occur. Therefore, when the detecting device 60 is the optical detecting device, a deficiency easily occurs, in particular, in the detecting device 60 when the adhesive 80 adheres to the detecting device 60. Therefore, the effect of preventing the adhesive from adhering to the detecting device 60 can be particularly usefully obtained when the detecting device 60 is the optical detecting device.

When the adhesive 80 is the anaerobic adhesive as in this embodiment, the adhesive 80 filled in the portion of the groove 24e opened to the injection hole section 26 is considered not to harden because the adhesive 80 comes into contact with the atmosphere in the injection hole section 26. Therefore, when the adhesive 80 is the anaerobic adhesive, in particular, a part of the adhesive 80 easily leaks to the outside of the injection hole section 26 without hardening. Therefore, the effect of preventing the adhesive 80 from leaking from the injection hole section 26 can be particularly usefully obtained when the adhesive 80 is the anaerobic adhesive.

In this embodiment, for example, when the unhardened adhesive 80 reaches the screw member 70 via the injection hole section 26, the unhardened adhesive 80 sometimes intrudes between the male screw section of the screw member 70 and the female screw section 26c of the injection hole section 26. In this case, the adhesive 80 intruding between the male screw section of the screw member 70 and the female screw section 26c of the injection hole section 26 is blocked from the air. Therefore, when the adhesive 80 is the anaerobic adhesive, the unhardened adhesive 80 hardens and is further prevented from leaking to the outside of the injection hole section 26. Further, the screw member 70 is fixed to the injection hole section 26 by the adhesive 80. The screw member 70 can be prevented from loosening with respect to the injection hole section 26.

Note that, for example, even if the adhesive 80 intruding between the male screw section of the screw member 70 and the female screw section 26c of the injection hole section 26 does not harden, the unhardened adhesive 80 can be prevented from leaking to the outside of the injection hole section 26 because a labyrinth structure is formed by the male screw section of the screw member 70 and the female screw section 26c of the injection hole section 26.

Note that, in this embodiment, configurations explained below can also be adopted.

In the above explanation, the housing 20 is configured from the three separate members. However, the housing 20 is not limited to this and may be a single member.

The screw member 70 may close any position in the injection hole section 26 if the screw member 70 closes at least a part between the first opening section 26a and the second opening section 26b in the injection hole section 26. Specifically, the screw member 70 may close an intermediate portion between the first opening section 26a and the second opening section 26b in the injection hole section 26, may close the second opening section 26b, or may close the entire injection hole section 26.

The rear end portion of the screw member 70 may be disposed further forward than the circumferential edge portion of the first opening section 26a. In this case as well, the screw member 70 does not project further rearward than the second housing 22. The detecting device 60 is easily disposed closer to the second housing 22. The rear end portion of the screw member 70 may be disposed further rearward than the circumferential edge portion of the first opening section 26a. The screw member 70 is not particularly limited and may be a screw other than the slotted set screw. The number of the injection hole sections 26 and the number of the screw members 70 are not particularly limited and may be one or two or may be four or more. The female screw section 26c may be formed in the entire injection hole section 26.

The bearings 51 and 52 may be a bearing other than the ball bearing such as a slide bearing. A type of the adhesive 80 for fixing the bearings 51 and 52 is not particularly limited and may be an adhesive other than the anaerobic adhesive. The detecting device 60 is not particularly limited if the detecting device 60 can detect the rotation of the rotor 30. The detecting device 60 may be a magnetic detecting device.

Robot in the Embodiment

Figure 5:
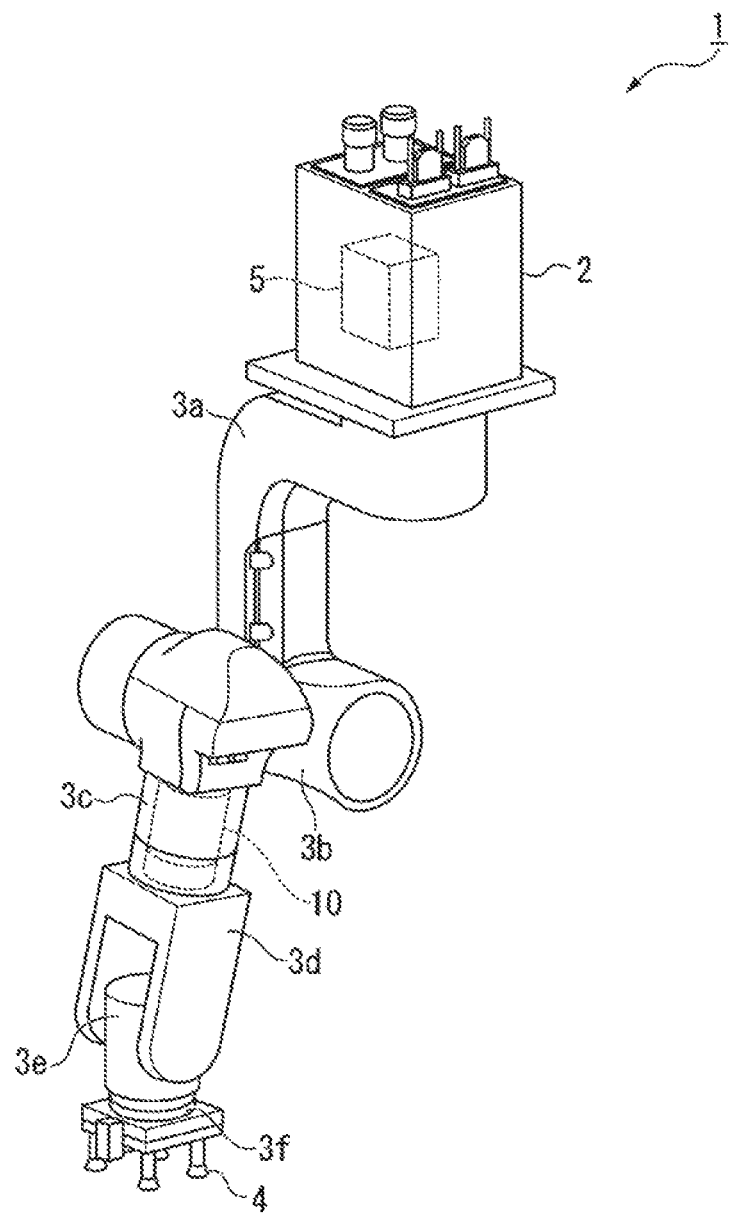
FIG. 5 is a perspective view showing a robot in the embodiment.

FIG. 5 is a perspective view showing a robot 1, which is an example of a robot mounted with the motor 10 in the embodiment. The robot 1 is a six-axis vertical articulated robot for ceiling suspension as shown in FIG. 5. The robot 1 includes a base 2, a first arm 3a, a second arm 3b, a third arm 3c, a fourth arm 3d, a fifth arm 3e, a sixth arm 3f, an end effector 4, a control section 5, and a motor 10.

The first arm 3a, the second arm 3b, the third arm 3c, the fourth arm 3d, the fifth arm 3e, and the sixth arm 3f are respectively coupled in this order via joints. The first arm 3a is fixed to the base 2. The end effector 4 is attached to the sixth arm 3f. The control section 5 is provided on the inside of the base 2. The control section 5 controls the operation of the robot 1. The motors 10 are incorporated in the arms. The arms are driven by the motors 10.

According to this embodiment, as explained above, since the adhesive 80 can be prevented from leaking to the outside of the second housing 22, a deficiency or the like of the detecting device 60 less easily occurs in the motor 10. Therefore, the robot 1 excellent in reliability can be obtained.

Note that the robot mounted with the motor 10 may be a robot other than the robot 1 and is not particularly limited. The robot mounted with the motor 10 may be a vertical articulated robot other than the vertical articulated robot for ceiling suspension, may be a robot having a degree of freedom of five axes or less or seven axes or more, or may be a double arm robot.

Note that uses of the motor 10 are not particularly limited. The motor 10 may be mounted on apparatuses other than the robot. The components explained above can be combined as appropriate in a range in which the components are not contradictory to one another.

The entire disclosure of Japanese Patent Application No. 2017-219721, filed Nov. 15, 2017 is expressly incorporated by reference herein.

What is claimed is:

1. A motor comprising:
    a stator including a coil;
    a rotor including a shaft and configured to rotate relative to the stator around an axis extending in a predetermined direction;
    a detector configured to detect a rotating position of the rotor;
    a holder disposed between the stator and the detector in the predetermined direction; and
    a bearing held by the holder and configured to rotatably support the shaft, wherein
    a recess opened toward the stator and housing the bearing and an injection hole including a first opening opened toward the detector, the injection hole communicating with the recess, are provided in the holder,
    a groove into which an adhesive is injected is provided on an inner surface of the recess, and an outer circumferential surface of the bearing is fixed to the inner surface via the adhesive,
    the injection hole includes a second opening opened in an inner circumferential surface of the recess and connected to the groove, and
    the injection hole is closed by a screw.

2. The motor according to claim 1, wherein the screw closes the first opening.

3. The motor according to claim 2, wherein an end portion on the detector side of the screw is disposed in a same position as a circumferential edge portion of the first opening in the predetermined direction or further on the stator side than the circumferential edge portion of the first opening.

4. The motor according to claim 1, wherein
    the detector include:
    a section to be detected fixed to the shaft; and
    a sensor capable of detecting a rotating position of the section to be detected, and
    the section to be detected covers the first opening.

5. The motor according to claim 4, wherein the detector is an optical detector.

6. The motor according to claim 1, wherein the adhesive is an anaerobic adhesive.

7. A robot comprising the motor according to claim 1.

* * * * *